S. T. MOSER.
ARMORED TIRE.
APPLICATION FILED OCT. 24, 1907.
928,064.
Patented July 13, 1909.
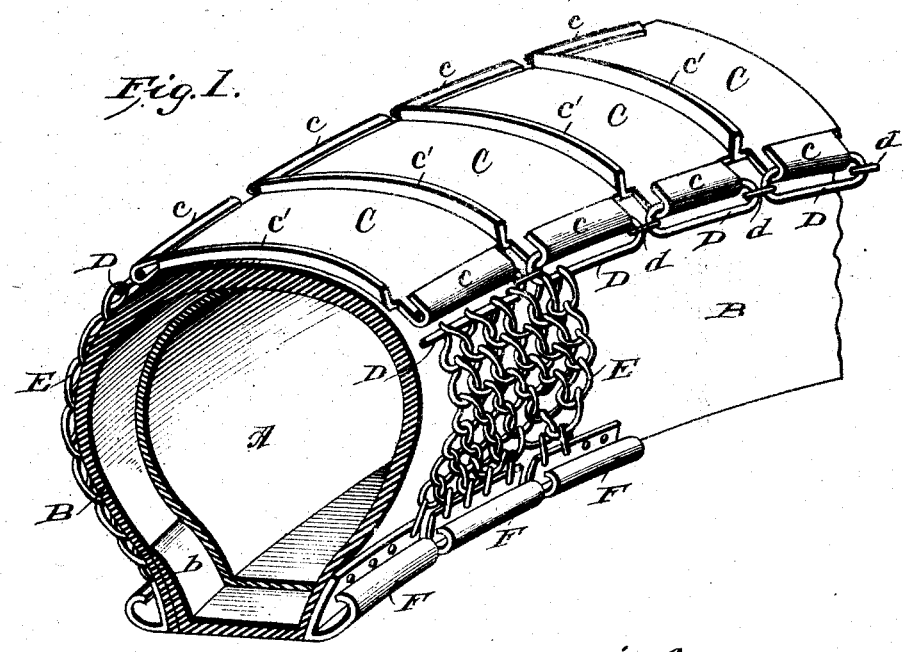
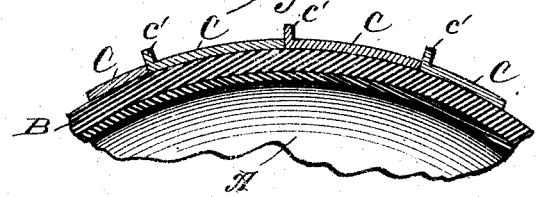
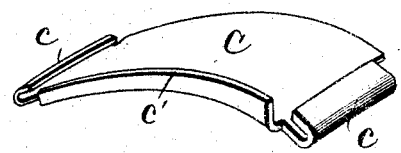
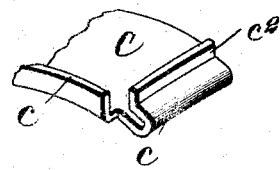
Witnesses
E. M. Callaghan
Geo. S. Brock
Inventor
Samuel T. Moser
Attorneys Munn & Co.

UNITED STATES PATENT OFFICE.

SAMUEL THOS. MOSER, OF HUNTDALE, NORTH CAROLINA.

ARMORED TIRE.

No. 928,064.	Specification of Letters Patent.	Patented July 13, 1909.

Application filed October 24, 1907. Serial No. 398,998.

*To all whom it may concern:*

Be it known that I, SAMUEL THOMAS MOSER, a citizen of the United States, and a resident of Huntdale, in the county of Mitchell and State of North Carolina, have invented a useful Improvement in Armored Tires, of which the following is a specification.

My invention relates to improvements in that class of tires which are armored and in which an air tube of the usual design is contained within the outer tube.

The object of this invention is to provide a tire and means for protecting the air tube from puncture and also to provide means for preventing "skidding" or slipping of the wheel and further to increase the traction and prolong the life of the tire.

To these ends my invention consists in certain novel features of construction, arrangement, and combination of parts as will be hereinafter fully described and pointed out in the claims, reference being had to the accompanying drawings in which—

Figure 1 is a sectional perspective view of a portion of a tire with my improvements applied. Fig. 2 is a fragmentary longitudinal vertical section of the tire and armor showing the curvature exaggerated. Fig. 3 is a perspective view of one of the protecting or armor plates. Fig. 4 is a perspective view of a part of a plate embodying a modified construction.

The inner or air tube A of the tire is inclosed in a casing B of rubber, leather or other suitable material.

The armor consists of a flexible steel shoe comprising the plates C, which are preferably slightly curved to conform to the outer surface of the casing B; each side edge of these plates is turned back to form loops $c$ in which are held the links D. One transverse edge of each plate is bent upwardly at an angle to the body of the plate and forms a ridge or rib $c'$ which extends across the tread of the tire; the loops $c$ do not extend entirely across the length of the plates but terminate a short distance from each end thus leaving a space or gap at each end. The links D which are elongated rest in the loops $c$ and are connected to each other by short links $d$ and depending from the links D on each side of the tire is an interwoven chain armor E, the lower edge of which is secured to the anchor plates F, which are bent to conform to the ordinary "clencher" type of rims. The anchor plates F are separated from each other and correspond in number to the plates C. This armor may be used with any other form of rim.

The air tube A may be of the usual design, and be inclosed in the casing or sheath B which is to be made of rubber, fabric and rubber, or leather to protect the air tube from chafing and from the weather; this sheath forming a complete covering for the air tube, and being provided with an extension flap $b$ or extra width to allow it to lap over the opposite edge to render it impervious to water or moisture; this sheath has no other mode of closing than the lap and extends entirely around the tire, being held closed and water-tight simply by the pressure of the inner tube upon said flap when said inner tube is inflated.

As shown in Fig. 4, the portions of the plates C which are bent to form the loops $c$ may be bent up at an angle to form flanges $c^2$, which will materially aid in preventing skidding and also add increased traction qualities to the armor.

By the use of my improvements which may be applied to nearly if not all of the pneumatic tires in common use for automobiles, a strong and flexible armor is provided which will prevent puncture and prevent skidding, and also produce increased traction.

The plain transverse edges of each plate abuts the upturned or flanged end of the adjacent plate as shown in Fig. 2, thus forming practically a continuous plate but one which will be thoroughly flexible. These armor plates in addition to forming an armor also receive all the strain of the air pressure on the casing B.

I claim:

1. In a rubber tire, the combination of a plurality of transversely curved metal plates adapted to hug the tread of the tire, said plates disposed with their adjacent edges abutting, each plate having one transverse edge bent upwardly forming a vertical flange and the other edge left flat, the upturned edge of each plate abutting the plane edge of the adjacent plate, each plate having its side edges bent upwardly and inwardly to form longitudinal loops, elongated links seated in said loops, short links connecting the elongated links of each pair of adjacent plates, chain armor links secured to and depending from the elongated links, a plurality of rim securing plates, each consisting of a vertical member and a curved outer member, the vertical member having openings to receive the links and the chain armor.

2. In a rubber tire, the combination of a plurality of transversely curved metal plates adapted to hug the tread of the tire, said plates disposed with their adjacent edges abutting, each plate having one transverse edge bent upwardly forming a vertical flange, and the other edge left flat, the upturned edge of each plate abutting the plane edge of the next adjacent plate, each plate also having its side edges turned upwardly, inwardly and then upwardly again to form longitudinal loops and longitudinal vertical flanges along each side edge, elongated links seated in said longitudinal loops, short links connecting each pair of adjacent elongated links, chain armor suspended from the elongated loops, a plurality of rim securing plates each comprising a vertical member and a curved member forming a hook to engage the wheel rim, said vertical member having openings to receive the links at the lower edge of the chain armor.

SAMUEL THOS. MOSER.

Witnesses:
J. M. CARR,
J. W. HOWELL.